(12) United States Patent
Hussaini et al.

(10) Patent No.: US 10,256,496 B2
(45) Date of Patent: Apr. 9, 2019

(54) POWER GENERATION SYSTEMS AND METHODS UTILIZING CASCADED FUEL CELLS

(71) Applicant: General Electric Company, Schenectady, NY (US)

(72) Inventors: Irfan Saif Hussaini, Glenville, NY (US); Andrew Philip Shapiro, Schenectady, NY (US); Matthew Joseph Alinger, Delmar, NY (US)

(73) Assignee: General Electric Company, Schenectady, NY (US)

( * ) Notice: Subject to any disclaimer, the term of this patent is extended or adjusted under 35 U.S.C. 154(b) by 580 days.

(21) Appl. No.: 14/321,124

(22) Filed: Jul. 1, 2014

(65) Prior Publication Data

US 2016/0006065 A1    Jan. 7, 2016

(51) Int. Cl.
*H01M 8/04*        (2016.01)
*H01M 8/06*        (2016.01)
(Continued)

(52) U.S. Cl.
CPC ....... *H01M 8/249* (2013.01); *H01M 8/04014* (2013.01); *H01M 8/04097* (2013.01);
(Continued)

(58) Field of Classification Search
None
See application file for complete search history.

(56) References Cited

U.S. PATENT DOCUMENTS 3,266,938 A * 8/1966 Parker ................. H01M 8/06
                                                            429/420
4,098,960 A * 7/1978 Gagnon ............ H01M 8/0612
                                                            429/410

(Continued)

FOREIGN PATENT DOCUMENTS

| DE | 10011849 A1 | 9/2001 |
| EP | 1511110 A2 | 3/2005 |
| EP | 1947723 A2 | 7/2008 |

OTHER PUBLICATIONS

Budzianowski et al.,"Solid-Oxide Fuel Cells in Power Generation Applications: A Review", Recent Patents on Engineering, Bentham Science, Dec. 2011, vol. 5, No. 3, Abstract 1 page. http://www.eurekaselect.com/94760/article.

(Continued)

*Primary Examiner* — Sarah A. Slifka
*Assistant Examiner* — Haroon S. Sheikh
(74) *Attorney, Agent, or Firm* — Ernest G. Cusick

(57) ABSTRACT

A power generation system including a first fuel cell configured to generate a first anode tail gas stream is presented. The system includes at least one fuel reformer configured to receive the first anode tail gas stream, mix the first anode tail gas stream with a reformer fuel stream to form a reformed stream; a splitting mechanism to split the reformed stream into a first portion and a second portion; and a fuel path configured to circulate the first portion to an anode inlet of the first fuel cell, such that the first fuel cell is configured to generate a first electric power, at least in part, by using the first portion as a fuel. The system includes a second fuel cell configured to receive the second portion, and to generate a second electric power, at least in part, by using the second portion as a fuel.

8 Claims, 11 Drawing Sheets

(51) Int. Cl.
*H01M 8/249* (2016.01)
*H01M 8/0612* (2016.01)
*H01M 8/2425* (2016.01)
*H01M 8/04014* (2016.01)
*H01M 8/04089* (2016.01)
*H01M 8/04119* (2016.01)
*H01M 8/124* (2016.01)

(52) U.S. Cl.
CPC ..... *H01M 8/04156* (2013.01); *H01M 8/0618* (2013.01); *H01M 8/2425* (2013.01); *H01M 2008/1293* (2013.01); *H01M 2250/407* (2013.01); *Y02E 60/563* (2013.01); *Y02P 90/40* (2015.11)

(56) References Cited

U.S. PATENT DOCUMENTS

| | | | |
|---|---|---|---|
| 6,344,289 | B2 | 2/2002 | Dekker et al. |
| 6,579,637 | B1* | 6/2003 | Savage ............. H01M 8/04156 429/412 |
| 6,623,880 | B1 | 9/2003 | Geisbrecht et al. |
| 7,001,682 | B2 | 2/2006 | Haltiner |
| 7,422,812 | B2 | 9/2008 | Haltiner et al. |
| 7,615,299 | B2 | 11/2009 | MacBain et al. |
| 7,659,015 | B2 | 2/2010 | Hoffjann et al. |
| 8,394,544 | B2 | 3/2013 | Chick et al. |
| 2004/0180249 | A1 | 9/2004 | Pham et al. |
| 2004/0229102 | A1* | 11/2004 | Jahnke ............. H01M 8/04097 429/410 |
| 2006/0199060 | A1 | 9/2006 | Horiuchi et al. |
| 2007/0281192 | A1 | 12/2007 | Sasaki |
| 2008/0041829 | A1* | 2/2008 | Blutke ................ C01B 3/342 219/121.36 |
| 2008/0187789 | A1 | 8/2008 | Ghezel-Ayagh |
| 2010/0047641 | A1 | 2/2010 | Jahnke et al. |
| 2010/0285378 | A1* | 11/2010 | Grieve ............ H01M 8/04089 429/425 |
| 2011/0123886 | A1* | 5/2011 | Hottinen .......... H01M 8/04014 429/429 |
| 2012/0251899 | A1 | 10/2012 | Lehar et al. |
| 2013/0130134 | A1 | 5/2013 | Chick et al. |
| 2013/0260268 | A1 | 10/2013 | Shapiro et al. |
| 2014/0060461 | A1 | 3/2014 | Shapiro et al. |

OTHER PUBLICATIONS

Adams et al.,"Energy Conversion with Solid Oxide Fuel Cell Systems: A Review of Concepts and Outlooks for the Short- and Long-T", I&EC, Ind. Eng. Chem, 2013, 52 (9), pp. 3089-3111.
Attached 250877_2_WO_Form_373_IPRP_dated Oct. 1, 2013.
European Search Report and Written Opinion issued in connection with corresponding EP Application No. 15173808.5-1359 dated Nov. 18, 2015.

* cited by examiner

POWER GENERATION SYSTEMS AND METHODS UTILIZING CASCADED FUEL CELLS

BACKGROUND

Embodiments of the invention generally relate to power generation systems and methods. More particularly, embodiments of the invention relate to cascaded fuel cell systems-based power generation systems and methods that include recirculation cycles, which can improve the overall efficiency of power generation.

Fuel cells are electrochemical energy conversion devices that have demonstrated a potential for relatively high efficiency and low pollution in power generation. A fuel cell generally provides a direct current (dc) which may be converted to alternating current (ac) via, for example, an inverter. The dc or ac voltage can be used to power motors, lights, and any number of electrical devices and systems. Fuel cells may operate in stationary, semi-stationary, or portable applications.

Certain fuel cells, such as solid oxide fuel cells (SOFCs), may operate in large-scale power systems that provide electricity to satisfy industrial and municipal needs. Others may be useful for smaller portable applications such as for example, powering cars. Common types of fuel cells include phosphoric acid (PAFC), molten carbonate (MCFC), proton exchange membrane (PEMFC), and solid oxide (SOFC), all generally named after their electrolytes.

In practice, fuel cells are typically amassed in electrical series, in an assembly of fuel cells (fuel cell) to produce power at useful voltages or currents. Therefore, interconnect structures may be used to connect or couple adjacent fuel cells in series or parallel. In general, components of a fuel cell include the electrolyte and two electrodes. The reactions that produce electricity generally take place at the electrodes where a catalyst is typically disposed to speed the reactions. The electrodes may be constructed as channels, porous layers, and the like, to increase the surface area for the chemical reactions to occur. The electrolyte carries electrically charged particles from one electrode to the other and is otherwise substantially impermeable to both fuel and oxidant.

Typically, the fuel cell converts hydrogen (fuel) and oxygen (oxidant) into water (byproduct) to produce electricity. The byproduct water may exit the fuel cell as steam in high-temperature operations. Hydrogen fuel may be provided via local reforming (e.g., on-site steam reforming) of carbon-based feedstock material, such as reforming of the more readily available natural gas and other hydrocarbon fuels and feedstock material. Examples of hydrocarbon fuels include natural gas, methane, ethane, propane, methanol, syngas, and other hydrocarbons.

The reforming of hydrocarbon fuel to produce hydrogen to feed the electrochemical reaction may be incorporated into the operation of the fuel cell. Moreover, such reforming may occur internal and/or external to the fuel cell. For reforming of hydrocarbons performed external to the fuel cell, the associated external reformer may be positioned remote from or adjacent to the fuel cell.

Fuel cell systems that can reform hydrocarbon internal and/or adjacent to the fuel cell may offer advantages, as described below. For example, the steam reforming reaction of hydrocarbons is typically endothermic, and therefore, internal reforming within the fuel cell or external reforming in an adjacent reformer may utilize the heat generated by the typically exothermic electrochemical reactions of the fuel cell. Furthermore, catalysts active in the electrochemical reaction of hydrogen and oxygen within the fuel cell to produce electricity may also facilitate internal reforming of hydrocarbon fuels. In SOFCs, for example, if a nickel catalyst is disposed at an electrode (e.g., an anode) to sustain the electrochemical reaction, the active nickel catalyst may also reform hydrocarbon fuel into hydrogen and carbon monoxide (CO). Moreover, both hydrogen and CO may be produced when reforming hydrocarbon feedstock. Thus, fuel cells, such as SOFCs that can utilize CO as fuel (in addition to hydrogen) are generally more attractive candidates for utilizing reformed hydrocarbon, and for internal and/or adjacent reforming of hydrocarbon fuel.

The exhaust components from fuel cells that operate at high temperatures can be directed to turbines and other types of engines, as part of a general combined cycle system. While such a system can be an attractive method for power generation, there are still some drawbacks present that can prevent wide-scale implementation. Some of the present day examples of fuel cells operating in simple-cycle mode, routinely achieve a conversion efficiency that is only about 50%. Thus there is a need for more efficient power generation systems that incorporate fuel cells.

BRIEF DESCRIPTION OF THE INVENTION

Embodiments of the present invention are included to meet these and other needs. One embodiment is a power generation system, comprising:

(i) a first fuel cell configured to generate a first anode tail gas stream and a first cathode tail gas stream;

(ii) at least one fuel reformer located downstream of the first fuel cell, the fuel reformer configured to receive the first anode tail gas stream, and to mix the first anode tail gas stream with a reformer fuel stream to form a reformed stream;

(iii) a splitting mechanism to split the reformed stream into a first portion and a second portion;

(iv) a fuel path configured to circulate the first portion to an anode inlet of the first fuel cell, such that the first fuel cell is configured to generate a first electric power, at least in part, by using the first portion as a fuel; and (v) a second fuel cell configured to receive the second portion, and to generate a second electric power, at least in part, by using the second portion as a fuel, the second fuel cell further configured to generate a second anode tail gas stream and a second cathode tail gas stream.

One embodiment is a method of power generation, comprising:

generating a first anode tail gas stream and a first cathode tail gas stream in a first fuel cell;

receiving the first anode tail gas stream in an external reformer located downstream of the first fuel cell, and mixing the first anode tail gas stream with a reformer fuel stream in the reformer to form a reformed stream;

splitting the reformed stream into a first portion and a second portion, and circulating the first portion to an anode inlet of the first fuel cell;

generating a first electric power (i.e., an amount of electric power) in the first fuel cell, at least in part, by using the first portion as a fuel;

receiving the second portion in a second fuel cell, and generating a second anode tail gas stream and a second cathode tail gas stream in the second fuel cell; and generating a second electric power, at least in part, by using the second portion as a fuel.

One embodiment is a power generation system, comprising:

(vi) a first fuel cell configured to generate a first anode tail gas stream and a first cathode tail gas stream;

(vii) a splitting mechanism to split the first anode tail gas stream into a first portion and a second portion;

(viii) a fuel path configured to circulate the first portion to an anode inlet of the first fuel cell, such that the first fuel cell is configured to generate a first electric power, at least in part, by using the first portion as a fuel; and (ix) a second fuel cell configured to receive the second portion, and to generate a second electric power, at least in part, by using the second portion as a fuel, the second fuel cell further configured to generate a second anode tail gas stream and a second cathode tail gas stream.

DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

Some of the embodiments described herein may advantageously provide increased plant efficiencies (e.g., greater than 65%), in particular embodiments that employ recirculation features.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Figure 1:
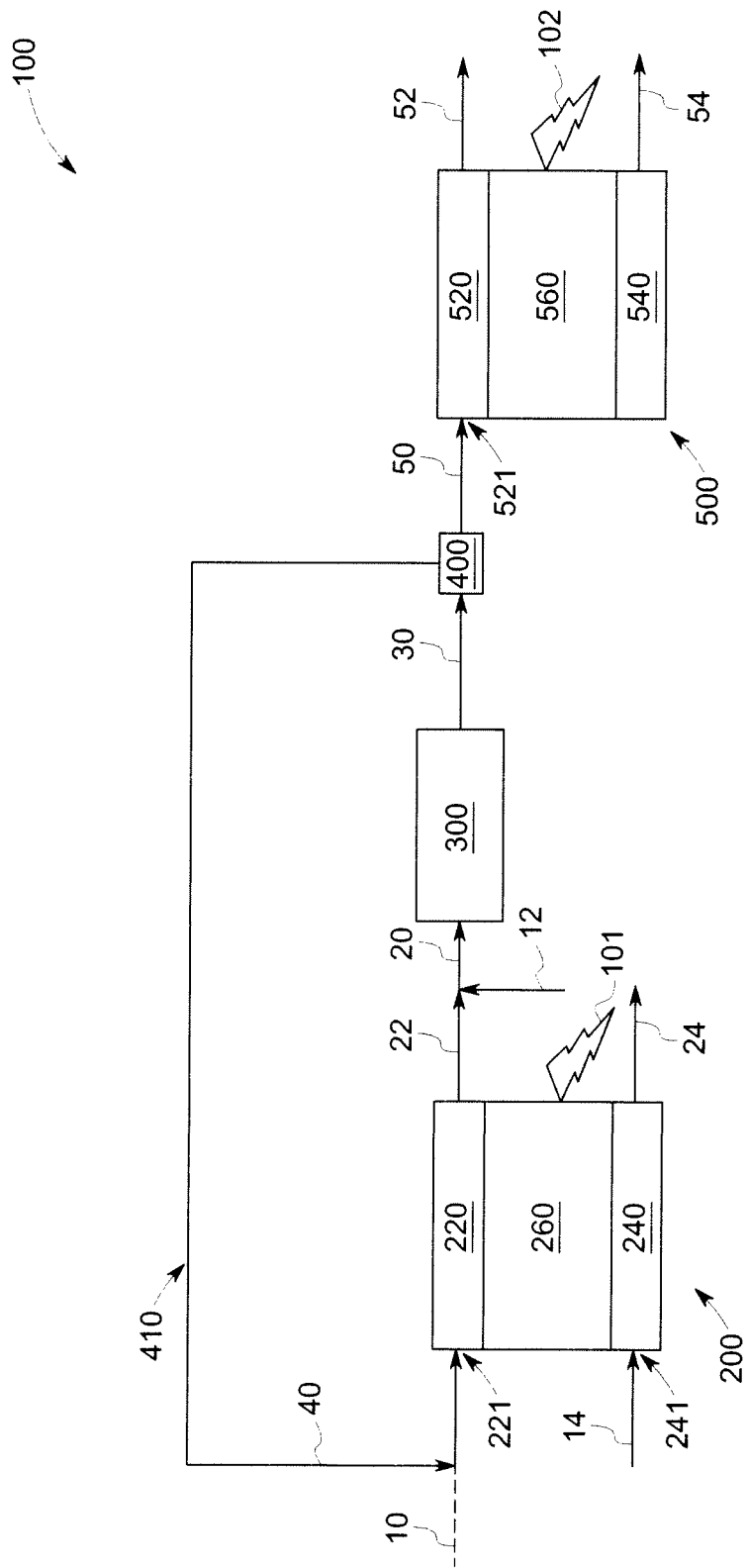
FIG. 1 is a schematic of a power generation system, according to an embodiment of the invention.

In some embodiments, a power generation system is presented. FIG. 1 is a schematic of a power generation system 100 including a first fuel cell 200 configured to generate a first anode tail gas stream 22 and a first cathode tail gas stream 24. As shown in FIG. 1, the first fuel cell 200 includes an anode 220, a cathode 240, and an electrolyte 260. Those skilled in the art understand the general structure and function of fuel cells. As described elsewhere herein, the first fuel cell 200 may be an SOFC device in certain embodiments. There are numerous advantages associated with the use of an SOFC device in this type of a power generation system.

With continued reference to FIG. 1, a fuel stream 10 is usually directed into an inlet 221 of the anode 220 of the first fuel cell 200, by any conventional routing mechanism. The fuel stream 10 may include any suitable fuel, a non-limiting example of which includes methane, ethane, propane, methanol, syngas, natural gas, or combinations thereof. In certain embodiments, the fuel stream 10 includes methane as fuel. As discussed in detail later, the fuel cell stream is further combined with a portion of the reformed stream, and directed into the inlet 221 of the anode 220. Thus, the anode inlet stream may include the fuel and one or more of hydrogen, water, carbon dioxide, and carbon oxide. An oxidant stream (e.g., oxygen or any suitable oxidant) 14 may also be directed into a cathode inlet 241 of the first fuel cell 200 by any conventional technique.

The fuel cell reaction of the first fuel cell 200 partially or fully converts the fuel into a mixture including hydrogen ($H_2$) and carbon monoxide (CO). These gases exit the anode 220 of the first fuel cell 200 through any suitable pathway, and constitute at least a portion of the anode exhaust, often referred to as the "first anode tail gas stream" 22. Water is another by-product, in steam- or liquid form. Thus, the anode tail gas stream may also include various other components in addition to $H_2$ and CO, such as water, steam, methane, and carbon dioxide. While various factors might affect its composition, the first anode tail gas stream may be comprised of at least about 10% by volume of $H_2$ and CO, and in some embodiments, at least about 20% of $H_2$ and CO, e.g., up to about 40%.

Those skilled in the art understand that electricity or electric power 101 is also produced in the fuel cell reaction, and routed out of the first fuel cell 200 through an appropriate electrical circuit (not specifically shown here).

With continued reference to FIG. 1, the power generation system 100 further includes at least one fuel reformer 300 located downstream of the first fuel cell 200, the fuel reformer 300 configured to receive the first anode tail gas stream 22, and to mix the first anode tail gas stream 22 with a reformer fuel stream 12 to form a reformed stream 30. In some embodiments, as shown in FIG. 1, the first anode tail gas stream 22 is combined with the reformer fuel stream 12 to form mixed fuel stream 20 prior to entering the reformer 300. In some other embodiments (not shown in figures), the two streams may be mixed after entering the reformer 300.

The term "downstream" as used herein means that the reformer 300 is configured to receive the first anode tail gas stream 22 from the first fuel cell 220. This is in contrast to typical fuel cell assemblies, in which the external reformer is located "upstream" of the fuel cell, and is typically configured such that the exhaust of the reformer is directed into an inlet of the fuel cell. The anode tail gas from the fuel cell in such systems is directed to tail gas burners instead of a reformer. Use of an external reformer that is located downstream of the fuel cell may advantageously allow enrichment of the anode tail gas stream through the endothermic steam-reforming process, a portion of which is directed to the second fuel cell after the split.

As noted earlier, the reformer fuel stream 12 (e.g., methane) is combined with the anode tail gas stream 22 in the reformer 300. The combination of incoming fuel stream 12 with at least a portion of the anode tail gas stream 22 is a desirable feature for some embodiments as it utilizes the steam generated in the fuel cell for reforming of methane. Combining the two streams further provides a sufficiently high steam-to-carbon ratio that is required to prevent coking in the reformer. It contrasts with some systems in the art, wherein incoming fuel was combined only with water or steam prior to the reforming step. The combination of fuel with the anode tail gas stream occurring prior to external reforming represents another important feature for some embodiments.

The reformer fuel stream 12 and the anode tail gas stream 22 are partly or fully converted into a reformed stream 30 (including, for example, $H_2$ and CO) within the reformer 300, according to a reforming reaction mentioned previously. The reforming reaction may also be promoted by some portion of the heat given off by the first fuel cell 200, in some embodiments.

The system 100 further includes a splitting mechanism 400 to split the reformed stream 30 into a first portion 40 and a second portion 50, as shown in FIG. 1. It should be noted that there is no restriction on the type of splitting mechanism used, and the illustration is meant to cover any type of standard splitting mechanism, e.g., a valve or piping mechanism. Moreover, in some embodiments of this invention, the features of the power generation system 100 that deal with the movement and/or division of gases and mixed-gas streams are free of membranes or membrane structures. The absence of the membranes and membrane structures may be advantageous—especially for larger-scale industrial systems.

With continued reference to FIG. 1, the power generation system 100 further includes a fuel path 410 configured to circulate a first portion 40 of the reformed stream 30 to an anode inlet 221 of the first fuel cell 200. In some embodiments, the first portion 40 is recirculated to the inlet 221 of the anode 220, thereby providing additional fuel for the first fuel cell 200. This inlet may be the same entryway or a different entryway as that used for the fuel stream 10.

In some embodiments, the first fuel cell 200 is configured to generate a first electric power 101, at least in part, by using the first portion 40 as a fuel. As mentioned previously, the reformed stream 30 contains hydrogen and carbon monoxide. After reforming, the recirculated gas stream 40 (now containing both the anode tail gas and the reformed fuel) may contain at least about 35% by volume of hydrogen and carbon monoxide, e.g., about 40-45%.

Recirculation of the hydrogen component to the first fuel cell 200 can enhance its efficiency considerably. Further, advantages provided by the recirculation features described herein may include without limitation, an automatic supply of water to an external reformer, negating the requirement for a separate water supply. Recirculation of a portion of the reformed stream to the anode inlet of the first fuel cell helps retain steam and thermal energy within the fuel stream, thus resulting in a higher efficiency system.

With continued reference to FIG. 1, the system 100 further includes a second fuel cell 500 configured to receive the second portion 50 of the reformed stream. As illustrated in FIG. 1, the second fuel cell 500 includes an anode 520, a cathode 540, and an electrolyte 560. As described earlier in the context of the first fuel cell 200, the second fuel cell 500 may also be an SOFC device.

As shown in FIG. 1, a second portion 50 of the reformed stream 30 is directed into an inlet 521 of the anode 520 of the second fuel cell 500, by any conventional routing mechanism. An oxidant stream (e.g., oxygen or any suitable oxidant) may also be directed into the second fuel cell 500 by any conventional technique (not shown in the Figures). In some embodiments, an additional fuel stream (not shown) may be further directed into an inlet 521 of the anode 520 of the second fuel cell 500.

The second fuel cell 500 is configured to receive a second portion 50 of the reformed stream 30, and to generate a second electric power 120, at least in part, by using the second portion 50 as a fuel. Thus, the second SOFC-based cycle fed by the second portion 50 of the reformed stream 30 represents a second cycle in power generation, in addition to the recirculation of the first portion 40 of the reformed stream 30. The second fuel cell 500 is further configured to generate a second anode tail gas stream 52 and a second cathode tail gas stream 54, as shown in FIG. 1.

In some embodiments, each portion 40, 50 of the reformed stream 30 may have substantially the same composition. In some embodiments, a ratio of the first portion 40 of the reformed stream 30 to a second portion 50 of the reformed stream 30 is in a range from about 0.4 to about 0.95. In some embodiments, a ratio of the first portion 40 of the reformed stream 30 to a second portion 50 of the reformed stream 30 is in a range from about 0.6 to about 0.95. In some embodiments, at least about 50 volume % of the total reformed stream 30 is recirculated to the anode 220 of the first fuel cell 200, with most or all of the remainder (second portion 50) being directed to the second fuel cell 500. In some embodiments, at least about 75 volume % of the total reformed stream 30 is recirculated to the anode 220, and in some instances, greater than about 85 volume % of the total reformed stream 30 is recirculated to the anode 220.

For the embodiment of FIG. 1, as well as other embodiments, at least two sources of electrical generation are present. As alluded to previously, the first fuel cell 200 itself is the first electrical production device, delivering first electric power 101 to a desired location, e.g., an external circuit. The second electrical production device is the second fuel cell 500 that also provides second electric power 102 to a desired location. The ability for the overall power generation system 100 to provide two sources of electrical power, with a "boost" originating by way of the recirculation cycle that feeds the first fuel cell 200, may be a distinct advantage in various industrial operations.

Further, by combining two or more fuel cells, electrical efficiency greater than 65% can be easily achieved. Furthermore, as fuel cells utilize an electrochemical conversion process for generating electric power, $NO_x$ emissions can be substantially eliminated, which is not possible in conventional combined cycle systems relying on internal/external combustion processes.

Some embodiments of the invention further advantageously provide for use of the heat generated in one or both of the first fuel cell 200 and the reformer 300 to heat one or more streams, thereby providing greater efficiency and lower energy costs.

Figure 2:
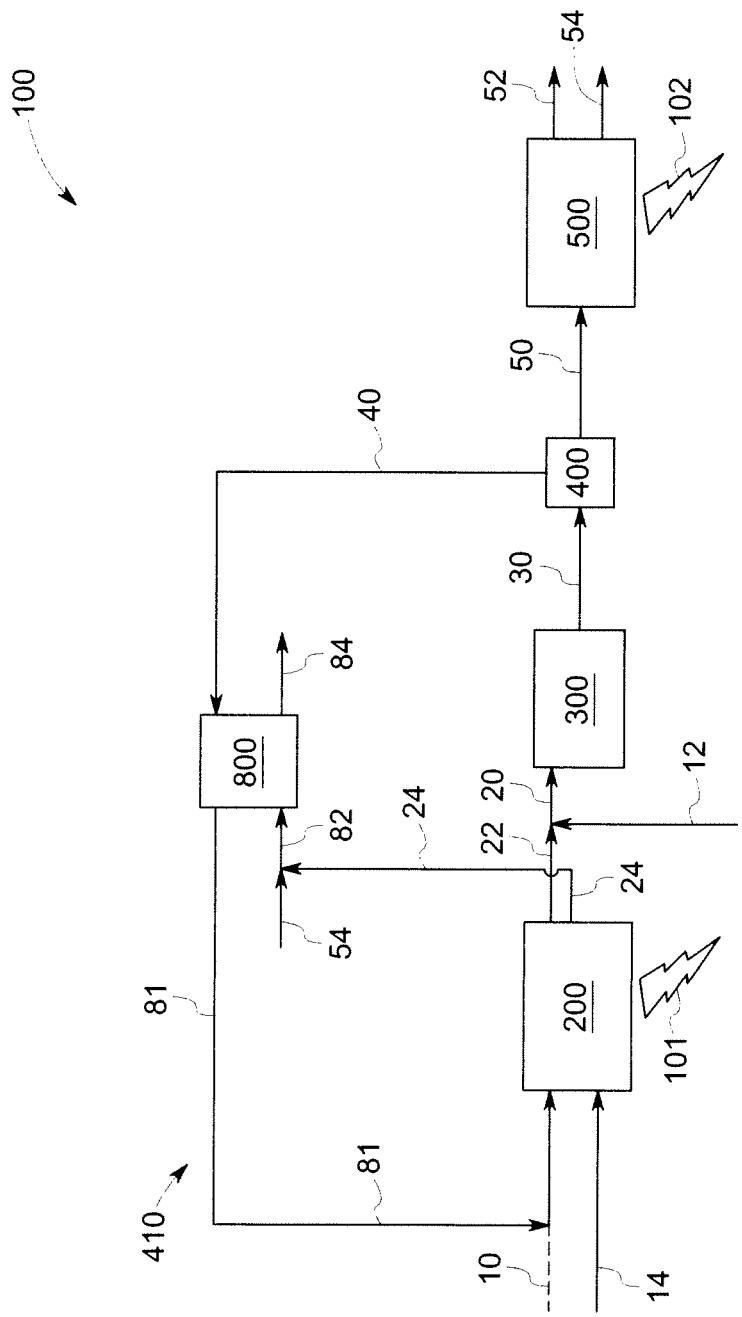
FIG. 2 is a schematic of a power generation system, according to an embodiment of the invention.

FIG. 2 is a schematic of a power generation system 100 similar to the system illustrated in FIG. 1, with the addition of a first recuperator 800. The first recuperator 800 is configured to receive and extract heat from at least a portion of the first cathode tail gas stream 24 and the second cathode tail gas stream 54. As illustrated in FIG. 2, the first cathode tail gas stream 24 and the second cathode tail gas stream 54 are combined together to form a combined cathode tail gas stream 82, and the recuperator 800 is configured to extract heat from the combined cathode tail gas stream 82. The recuperator 800 is further configured to transfer at least a portion of the extracted heat to the first portion of the reformed stream 40, as shown in FIG. 2. The first portion 40 is therefore heated in the recuperator to form a heated recycled stream 81 prior to entering the anode inlet 221 (not shown) of the first fuel cell 200. The recuperator 800 is further configured to form a cooled cathode tail gas stream 84, as shown in FIG. 2.

In should be noted that in embodiments illustrated in FIG. 2, the first cathode tail gas stream 24 is combined with the second cathode tail gas stream 54 to form the combined cathode tail gas stream 82, prior to entering the recuperator 800. In some other embodiments (not shown in figures), the two streams may be mixed after entering the recuperator 800.

Figure 3:
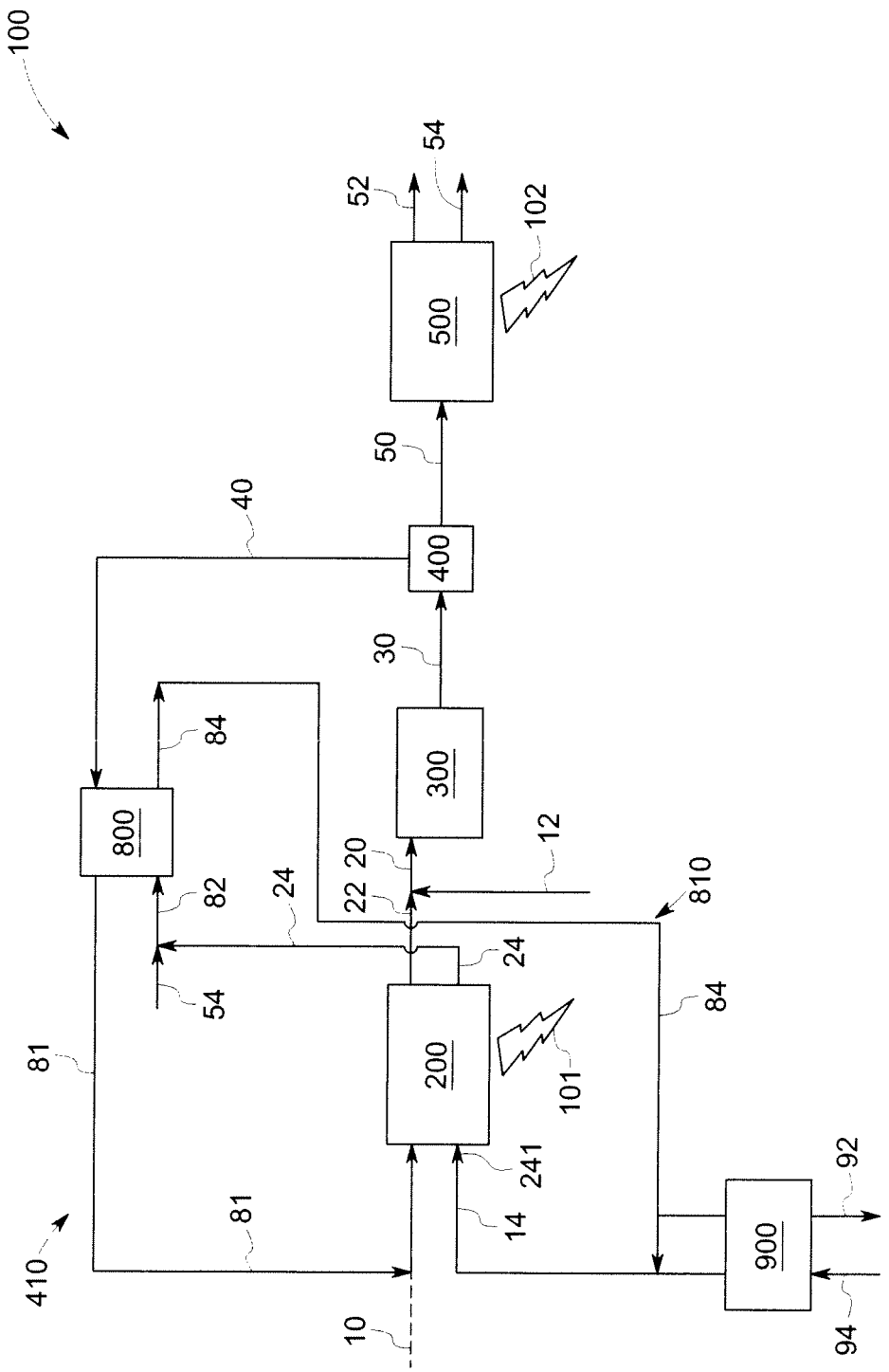
FIG. 3 is a schematic of a power generation system, according to an embodiment of the invention.

FIG. 3 is a schematic of a power generation system 100 similar to the system illustrated in FIG. 2, with the addition that the system further includes a recycle loop 810. As shown in FIG. 3, the recycle loop is configured to circulate at least a portion of the cooled cathode tail gas stream 84 to a cathode inlet 241 of the first fuel cell 200. Thus, in the embodiments shown in FIG. 3, the cathode inlet stream 14 is further mixed with at least a portion of the cold cathode tail gas stream 84, thereby reducing the size of the heat exchanger 900, providing cost and space savings.

In some embodiments, at least a portion of the cooled cathode tail gas stream 84 may be further utilized to heat the cathode inlet stream 94. Referring again to FIG. 3, in some embodiments, the power generation system further includes an air pre-heater 900 configured to extract heat from at least a portion of the cooled cathode tail gas stream 84, and to transfer at least a portion of the extracted heat to a cathode inlet stream 94 of the first fuel cell 200.

Figure 4:
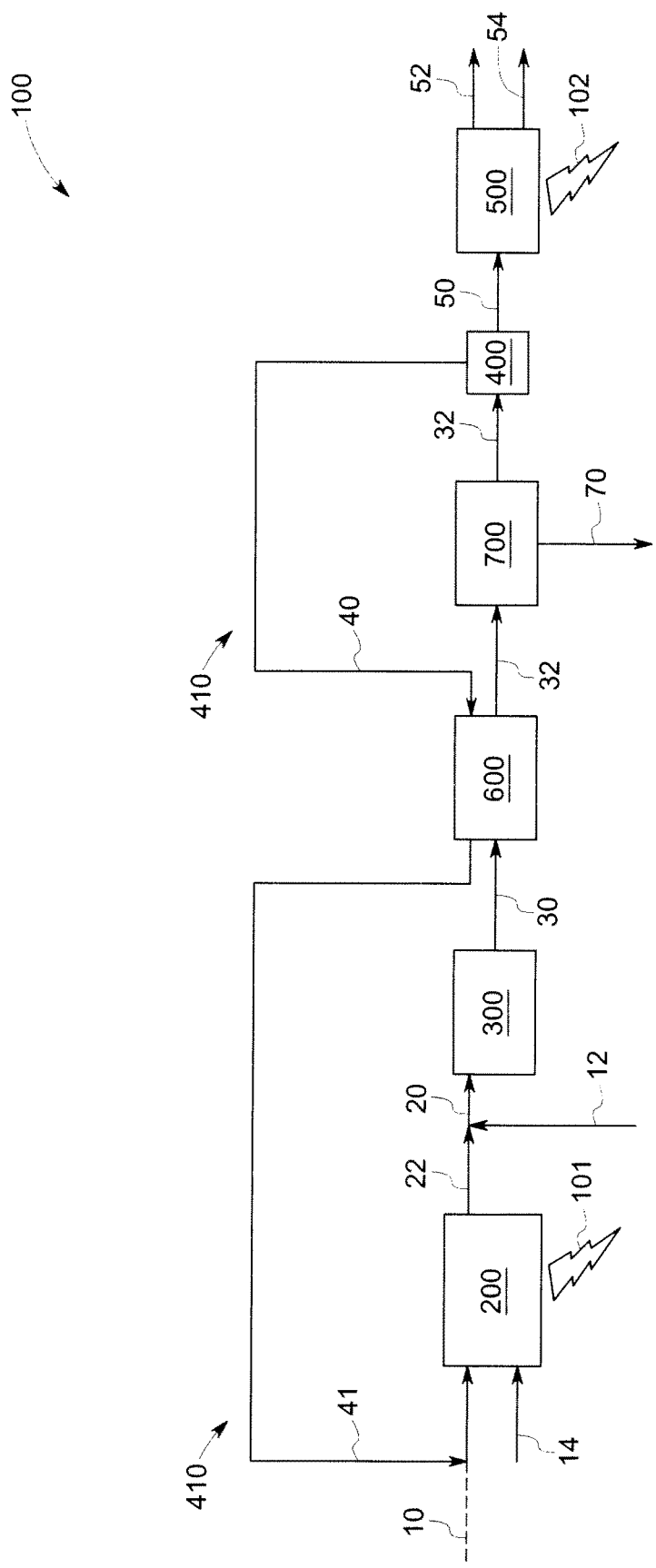
FIG. 4 is a schematic of a power generation system, according to an embodiment of the invention.

Referring now to FIG. 4, another embodiment of a power generation system 100 is presented. The power generation system illustrated in FIG. 4 is similar to the system illustrated in FIG. 1, with the addition that the system further includes a second recuperator 600. As shown in FIG. 4, the second recuperator 600 is located downstream of the reformer 300 and upstream of the splitting mechanism 400. The second recuperator 600 is configured to extract heat from the reformed stream 30 to form a cooled reformed stream 32, and to transfer at least a portion of the extracted heat to the first portion of the reformed stream 40, thereby forming a heated recycle stream 41. In such instances, the heat generated in the reformer 300 is used to further heat the portion 40 of the reformed stream that is recycled to the anode inlet 221 (i.e., as shown in FIG. 1) of the first fuel cell 200.

In some embodiments, as shown in FIG. 4, the power generation system 100 further includes a first water separation unit 700 located downstream of the second recuperator 600 and upstream of the splitting mechanism 400. The first water separation unit 700 is configured to separate at least a portion of water 70 from the cooled reformed stream 32. The first water separation unit 700 may be designed to retain a sufficient amount of water vapor to provide a certain steam-to-carbon ratio for the anode inlet stream to the second fuel cell 500. This may be achieved by controlling the outlet temperature of the first water separation unit 700.

Figure 5:
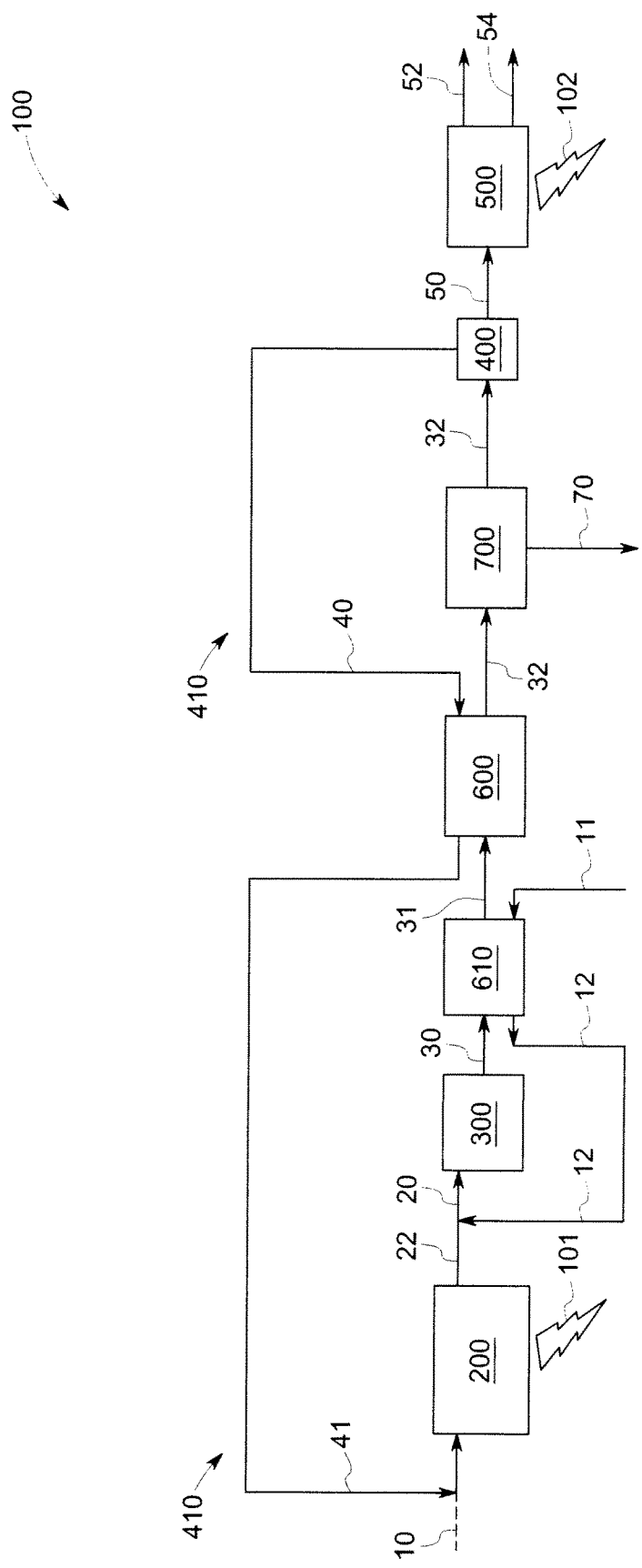
FIG. 5 is a schematic of a power generation system, according to an embodiment of the invention.

Referring now to FIG. 5, another embodiment of a power generation system 100 is presented. The power generation system illustrated in FIG. 5 is similar to the system illustrated in FIG. 4, with the addition of a first fuel pre-heater 610 located downstream of the reformer 300 and upstream of the second recuperator 600. The first fuel pre-heater 610 is configured to extract heat from the reformed stream 30 to form cooled reformed stream 31, and to transfer at least a portion of the extracted heat to the fuel stream 11 entering the reformer 300. In such instances, the heat generated in the reformer is used to further heat the inlet fuel stream entering the reformer 300.

Figure 6:
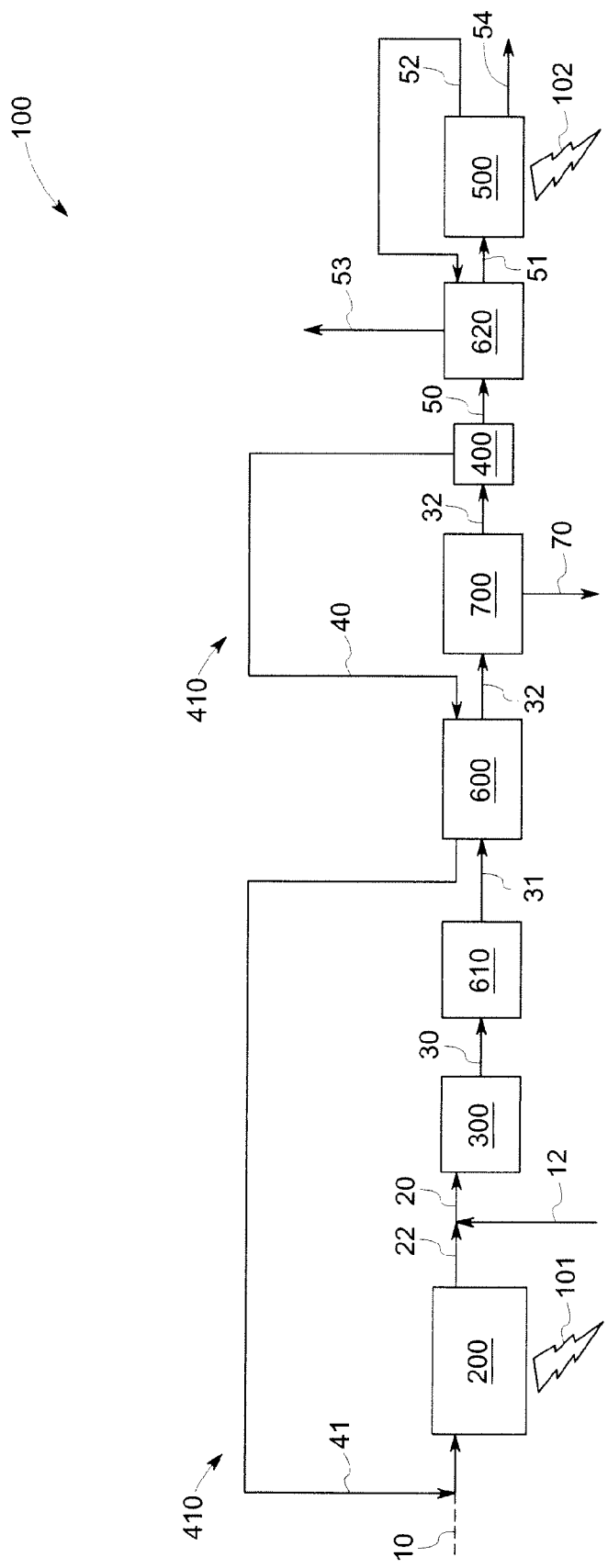
FIG. 6 is a schematic of a power generation system, according to an embodiment of the invention.

FIG. 6 illustrates another embodiment of the invention, and the power generation system is similar to the system illustrated in FIG. 5, with the addition of a second fuel pre-heater 620. The second pre-heater 620 is located downstream of the splitting mechanism 400 and upstream of the second fuel cell 500, as shown in FIG. 6. The second fuel pre-heater 620 is configured to extract heat from the second anode tail gas stream 52 to form a cooled second anode tail gas stream 53, and to transfer at least a portion of the extracted heat to the second portion 50 of the reformed stream 30 to form the heated stream 51. In such instances, the heat generated in the second fuel cell 500 is used to further heat the anode inlet stream entering the second fuel cell 500.

Figure 7:
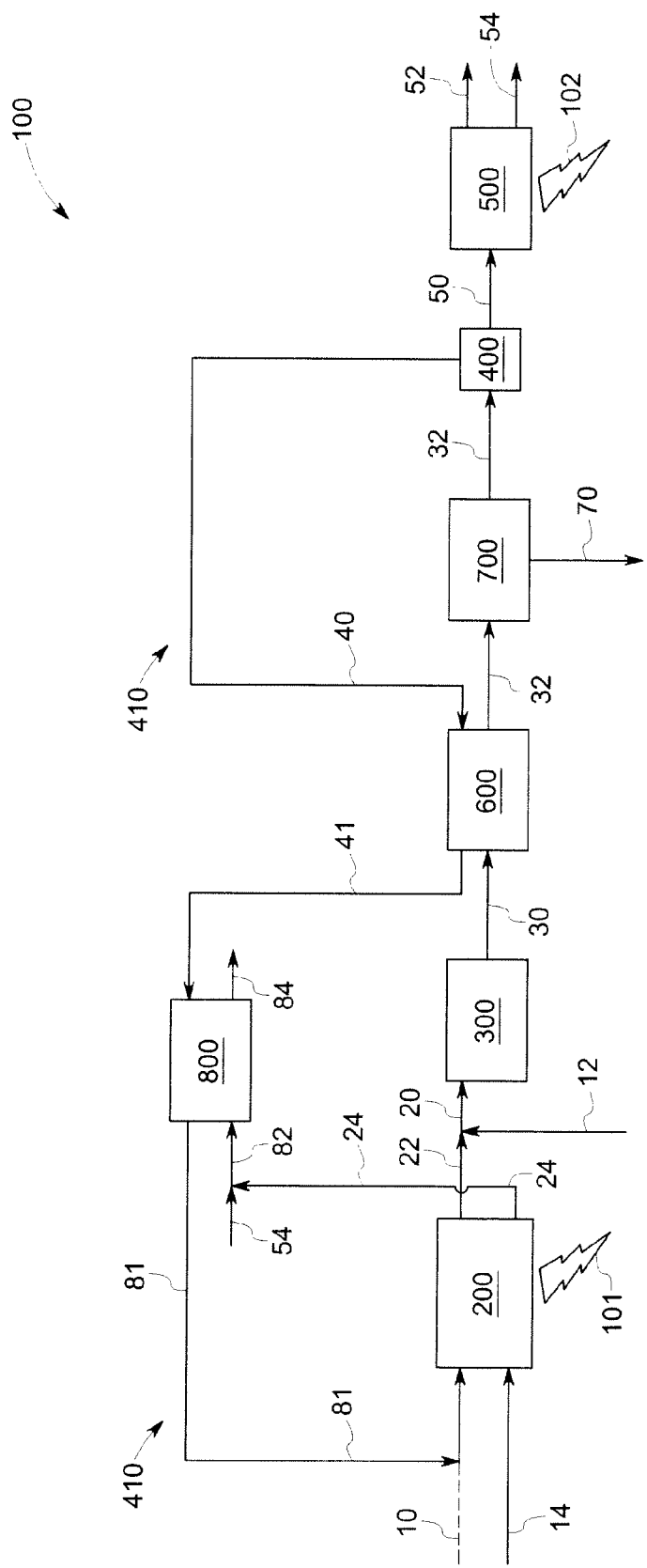
FIG. 7 is a schematic of a power generation system, according to an embodiment of the invention.

Referring now to FIG. 7, a power generation system 100 including both the first recuperator 800 and the second recuperator 600 is presented. The system is similar to the system illustrated in FIG. 1, with the addition of a second recuperator 600 located downstream of the reformer 300 and upstream of the splitting mechanism 400. The second recuperator 600 is configured to extract heat from the reformed stream 30 to form a cooled reformed stream 32, and to transfer at least a portion of the extracted heat to the first portion of the reformed stream 40, thereby forming a heated recycle stream 41. In such instances, the heat generated in the reformer 300 is used to further heat the portion 40 of the reformed stream recycled to the anode inlet 221 (i.e., see FIG. 1) of the first fuel cell 200. As illustrated in FIG. 7, in such embodiments, the system 100 further includes a first recuperator 800. The first recuperator 800 is configured to receive and extract heat from at least a portion of the first cathode tail gas stream 24 and the second cathode tail gas stream 54. The recuperator 800 is further configured to transfer at least a portion of the extracted heat to the heated recycle stream 41. The heated recycle stream 41 is therefore further heated in the first recuperator 800 to form a heated recycled stream 81 prior to entering the anode inlet 221 of the first fuel cell 200. In such instances, the anode inlet stream is heated using two different heat sources (reformer exhaust heat and the cathode tail gas heat) to heat the anode inlet stream of the first fuel cell 200.

Figure 8:
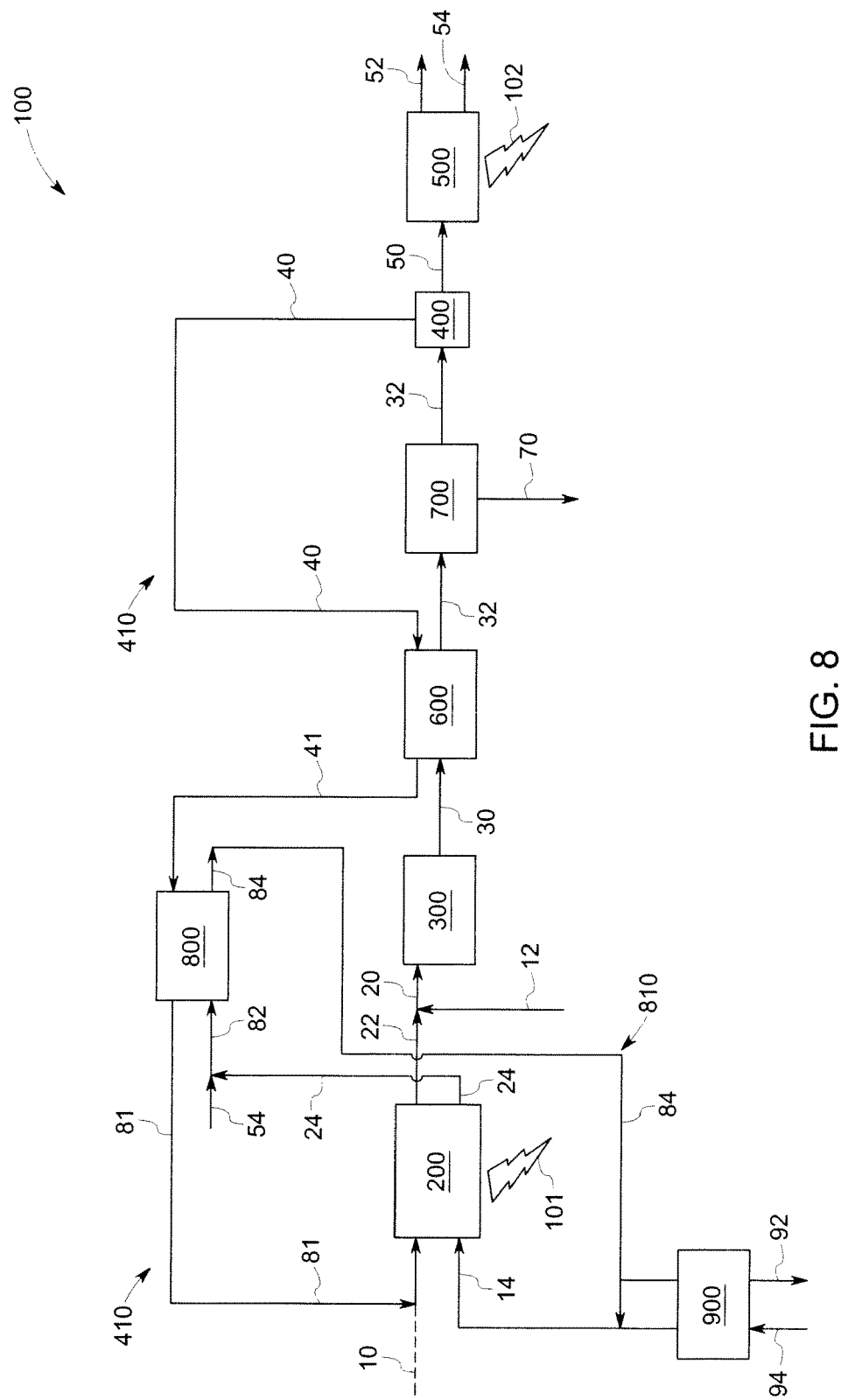
FIG. 8 is a schematic of a power generation system, according to an embodiment of the invention.

Referring now to FIG. 8, a power generation system similar to the system of FIG. 7 is presented, with the addition of a recycle loop 810. As shown in FIG. 8, the recycle loop 810 is configured to circulate at least a portion of the cooled cathode tail gas stream 84 (formed in the recuperator 800) to a cathode inlet of the first fuel cell 200. In some embodiments, at least a portion of the cooled cathode tail gas stream 84 may be further utilized to heat the cathode inlet stream. Referring again to FIG. 8, in some embodiments, the power generation system 100 further includes an air pre-heater 900 configured to extract heat from at least a portion of the cooled cathode tail gas stream 84, and to transfer at least a portion of the extracted heat to a cathode inlet stream 94 of the first fuel cell 200.

Figure 9:
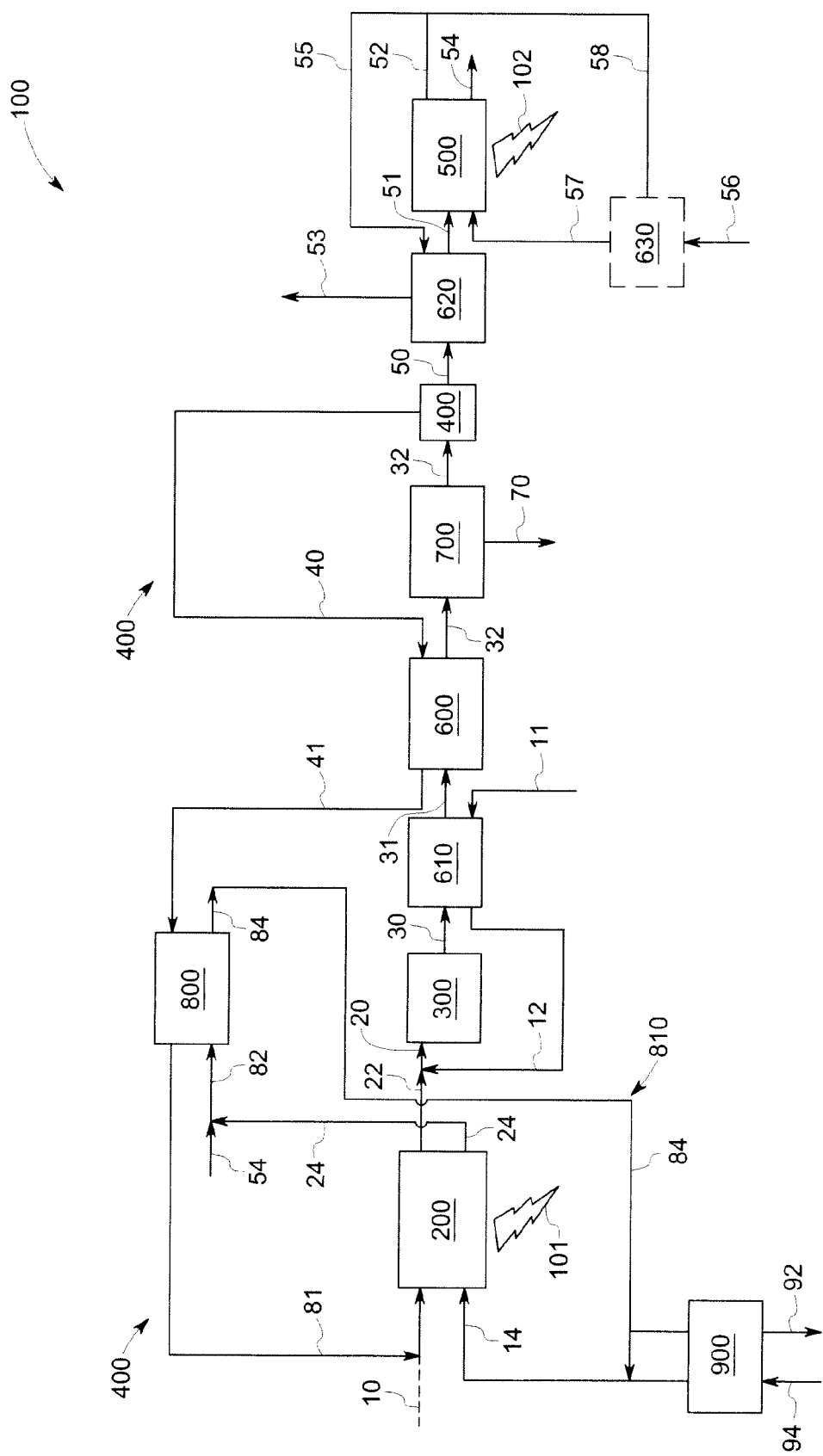
FIG. 9 is a schematic of a power generation system, according to an embodiment of the invention.

Referring now to FIG. 9, a power generation system similar to the system of FIG. 8 is presented, with the addition of a first fuel pre-heater 610 and a second fuel pre-heater 620. The first fuel pre-heater 610 is located downstream of the reformer 300 and upstream of the second recuperator 600. The first fuel pre-heater 610 is configured to extract heat from the reformed stream 30, and to transfer at least a portion of the extracted heat to the fuel stream 11 entering the reformer 300. In such instances, the heat generated in the reformer 300 is used to further heat the reformer fuel stream 12 entering the reformer 300.

The second pre-heater 620 is located downstream of the splitting mechanism 400 and upstream of the second fuel cell 500, as shown in FIG. 9. The second fuel pre-heater 620 is configured to extract heat from at least a portion 55 of the second anode tail gas stream 52 to form a cooled second anode tail gas stream 53, and to transfer at least a portion of the extracted heat to the second portion 50 of the reformed stream 30. In such instances, the heat generated in the second fuel cell 500 is used to further heat the anode inlet stream 51 entering the second fuel cell 500.

Referring again to FIG. 9, in some embodiments, the system 100 may further optionally include a burner 630 for heating the oxygen or oxidant stream prior to entering the cathode inlet of the second fuel cell 500 as the second cathode inlet stream 57. As illustrated in FIG. 9, in such instances a portion 58 of the second anode tail gas stream 52 may be used to heat the oxygen or oxidant stream 56 in the burner 630.

Figure 10:
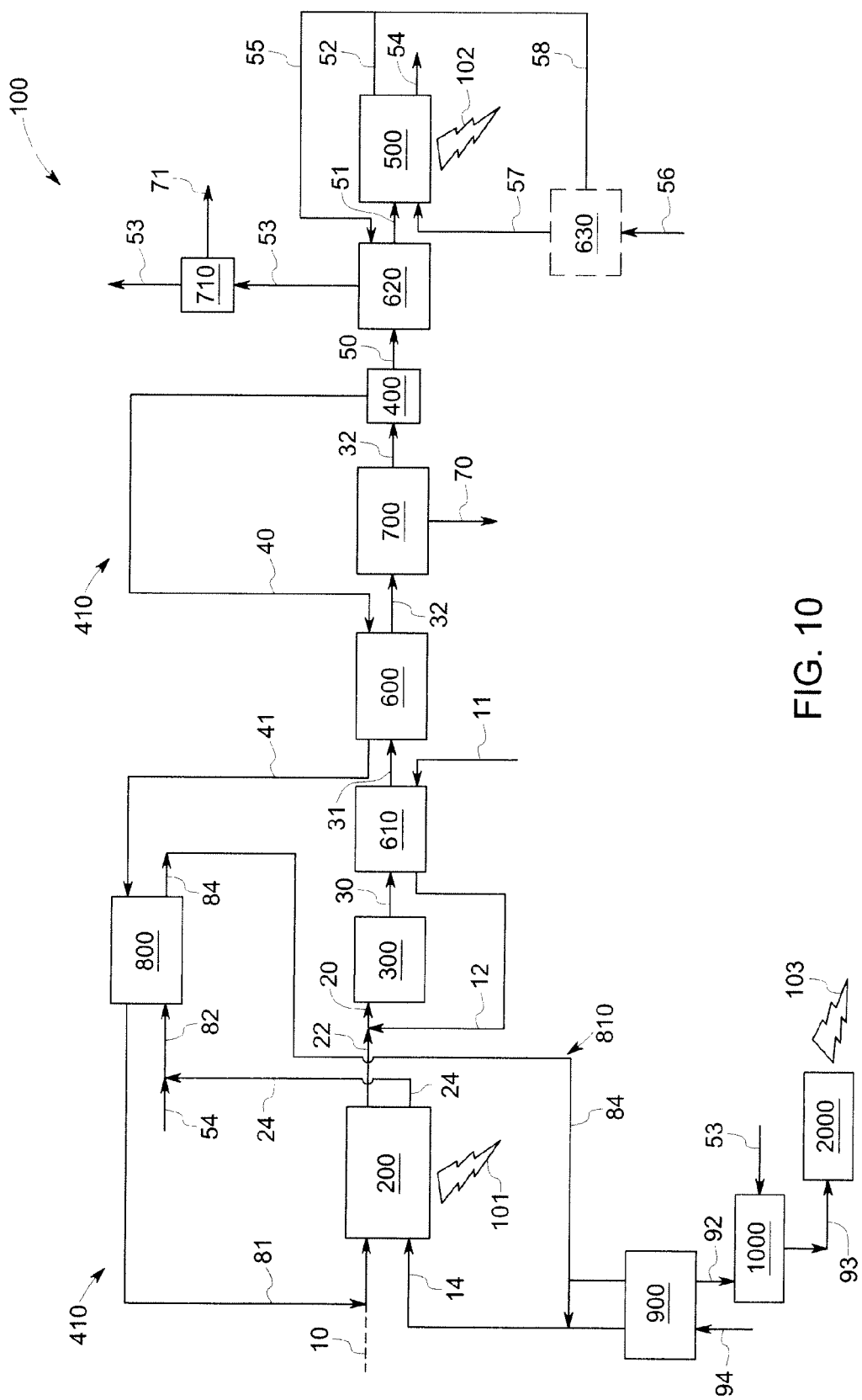
FIG. 10 is a schematic of a power generation system, according to an embodiment of the invention.

Referring now to FIG. 10, a power generation system 100 including three sources of electrical power is presented. The power generation system 100 illustrated in FIG. 10 is similar to that of FIG. 9, with the addition that the system 100 further includes an external combustion engine 2000. The system 100 further includes a second water separation unit 710 configured to extract at least a portion of water 71 from the cooled second anode tail gas stream 53, which may be then received by a combusting unit 1000, as shown in FIG. 10. The combusting unit 1000 is configured to receive at least a portion of the cooled second anode tail gas stream 53, and at least a portion of the cooled cathode tail gas stream 92.

As shown in FIG. 10, the system 100 further includes an external combustion engine 2000 configured to receive an exhaust 93 from the combusting unit 1000 to generate a third electric power 103. Non-limiting examples of suitable external combustion engines include Sterling engine, organic Rankine cycle (ORC), turbine generator, and the like. In some embodiments, stream 93 may be used (without the engine 2000) as a heat source to meet process or space heating requirements (combined heat and power mode), or for providing space cooling when coupled with a vapor absorption system, for example.

A method of power generation is also presented. The method is described with reference to FIG. 1, and includes generating a first anode tail gas stream 22 and a first cathode tail gas stream 24 in a first fuel cell 200. The method further includes receiving the first anode tail gas stream 22 in an external reformer located 300 downstream of the first fuel cell 200, and mixing the first anode tail gas stream 22 with a fuel stream 12 in the reformer 300 to form a reformed stream 30.

With continued reference to FIG. 1, the method includes splitting the reformed stream 30 into a first portion 40 and a second portion 50, and circulating the first portion 40 to an anode inlet 221 of the first fuel cell 200. The method further includes generating a first amount of electric power 101 in the first fuel cell 200, at least in part, by using the first portion 40 as a fuel. The method further includes receiving the second portion 50 in a second fuel cell 500, and generating a second anode tail gas stream 52 and a second cathode tail gas stream 54 in the second fuel cell 500. The method further includes generating a second electric power 102, at least in part, by using the second portion 50 as a fuel.

Referring now to FIG. 2, the method may further include extracting heat from at least a portion of the first cathode tail gas stream 24 and the second cathode tail gas stream 54 in a first recuperator 800, and transferring at least a portion of the extracted heat to the first portion 40 of the reformed stream.

Referring now to FIG. 3, the method may further include forming a cooled cathode tail gas stream 84 in the first recuperator 800, and circulating at least a portion of the cooled cathode tail gas stream 84 to a cathode inlet 241 of the first fuel cell 200. With continued reference to FIG. 3, the method may further include extracting heat from at least a portion of the cooled cathode tail gas stream 84 in an air pre-heater 900, and transferring at least a portion of the extracted heat to a cathode inlet stream 94 of the first fuel cell 200.

Referring now to FIG. 4, the method may further include extracting heat from the reformed stream 30 to form a cooled reformed stream 32 in a second recuperator 600, and transferring at least a portion of the extracted heat to the first portion 40 of the reformed stream 30. With continued reference to FIG. 4, the method may further include separating at least a portion of water 70 from the cooled reformed stream 32 in a first water separation unit 700.

Referring now to FIGS. 5 and 6, the method may further include extracting heat from the reformed stream 30 in a first fuel pre-heater 610, and transferring at least a portion of the extracted heat to the reformer fuel stream 11 entering the reformer 300. The method may further include extracting heat from the second anode tail gas stream 52 to form a cooled second anode tail gas 53 in a second fuel pre-heater 620, and transferring at least a portion of the extracted heat to the second portion 50 of the reformed stream 30.

Referring now to FIG. 10, in some embodiments, the method may further include combusting at least a portion of the cooled second anode tail gas stream 53 in a combusting unit 1000; and generating a third amount of electric power 103 in an external combustion engine, at least in part, by using an exhaust 93 from the combustion unit 1000 as a fuel.

Figure 11:
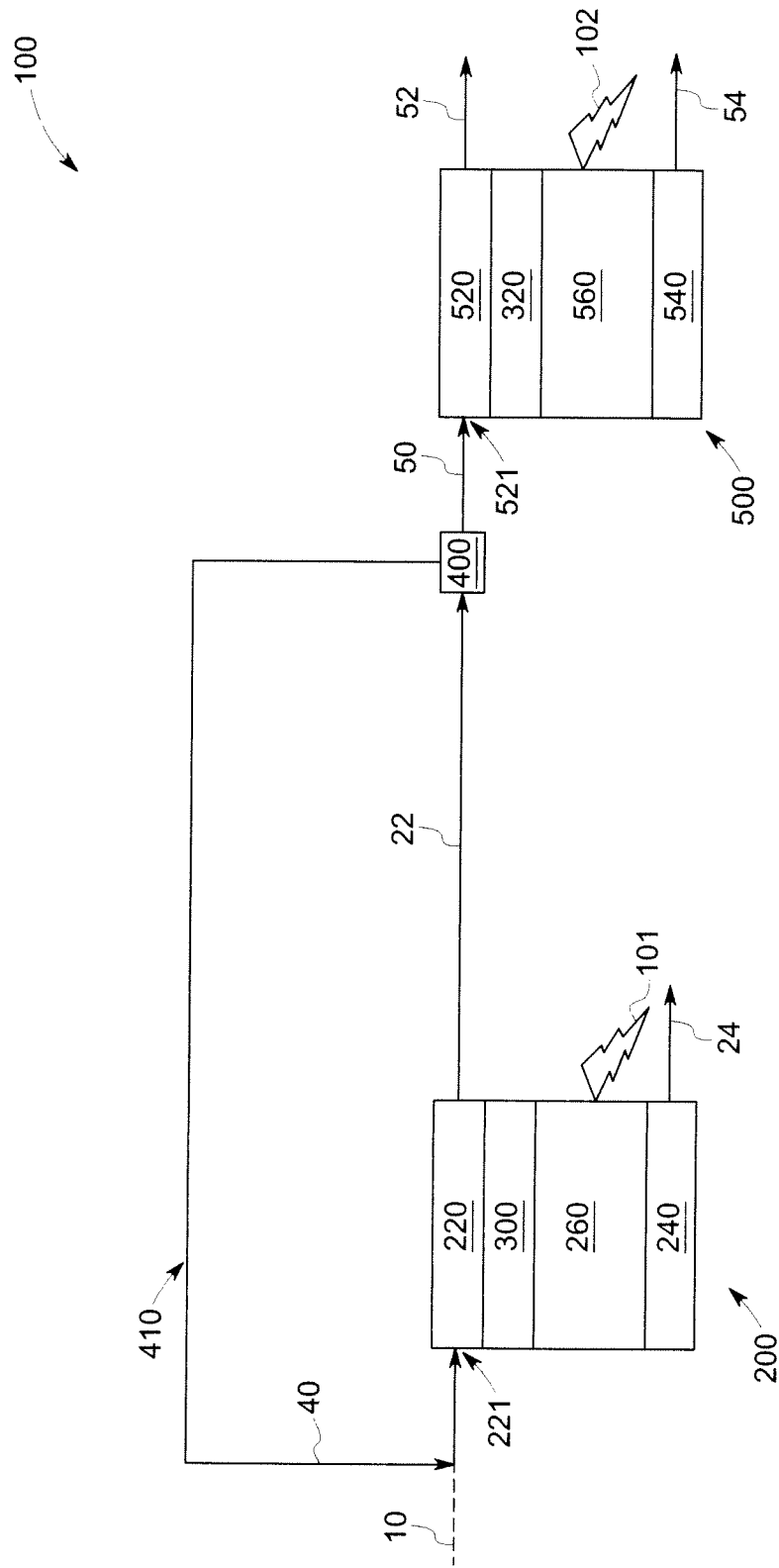
FIG. 11 is a schematic of a power generation system, according to an embodiment of the invention.

The embodiments described herein above relate to cascaded fuel cell systems including an external reformer located between the two fuel cells. In some embodiments, a power generation system including fuel cells with internal reforming is also presented. FIG. 11 illustrates a power generation system 100 in accordance with such embodiments. As illustrated in FIG. 11, the first fuel cell 200 includes an internal reformer 300. The reformer is depicted simply as the feature 300 in FIG. 11, which is meant to represent the reforming action of these types of fuel cells. As mentioned previously, such a reformer can function by utilizing the heat generated by the exothermic, electrochemical reactions of the fuel cell. Furthermore, the fuel cell system can in some cases include catalysts that also facilitate internal reforming, as described previously. The use of an internal reformer may be advantageous in some situations, in terms of simplicity in design and operation, and in view of some of the thermodynamic considerations mentioned above.

As mentioned previously with reference to FIG. 1, the first fuel cell 200 is configured to generate a first anode tail gas stream 22 and a first cathode tail gas stream 24. As shown in FIG. 11, the first fuel cell 200 further includes an anode 220, a cathode 240, and an electrolyte 260. With continued reference to FIG. 11, a fuel stream 10 is usually directed into an inlet 221 of the anode 220 of the first fuel cell 200, by any conventional routing mechanism. An oxidant stream (e.g., oxygen or any suitable oxidant) 14 may also be directed into a cathode inlet 241 of the first fuel cell 200 by any conventional technique.

The reforming reaction of the first fuel cell 200 partially or fully converts the fuel into a mixture including hydrogen ($H_2$) and carbon monoxide (CO) and constitutes the first anode tail gas stream 22 (along with other components). Referring again to FIG. 11, the system 100 further includes a splitting mechanism 400 to split the first anode tail gas stream 22 into a first portion 40 and a second portion 50. The power generation system 100 further includes a fuel path 410 configured to circulate the first portion 40 to an anode inlet 221 of the first fuel cell 200. In some embodiments, the first portion 40 is recirculated to the inlet 221 of the anode 220, thereby providing additional fuel for the first fuel cell 200. This inlet may be the same entryway or a different entryway as that used for the fuel stream 10. In some embodiments, the first fuel cell 200 is configured to generate a first electric power 110, at least in part, by using the first portion 40 as a fuel.

With continued reference to FIG. 11, the system 100 further includes a second fuel cell 500 configured to receive the second portion 50. As illustrated in FIG. 11, the second fuel cell 500 includes an anode 520, a cathode 540, and an electrolyte 560. As shown in FIG. 11, the second portion 50 is directed into an inlet 521 of the anode 520 of the second fuel cell 500, by any conventional routing mechanism. An oxidant stream (e.g., oxygen or any suitable oxidant) may also be directed into the second fuel cell 500 by any conventional technique (not shown in the Figures). In some embodiments, an additional fuel stream (not shown) may be further directed into an inlet 521 of the anode 520 of the second fuel cell 500.

The system 100 illustrated in FIG. 11 may further include embodiments described earlier with reference to FIGS. 2-10, wherein the heat generated in one or both of the first fuel cell 200 and the reformer 300 may be used to heat one or more streams, thereby providing greater efficiency and lower energy costs.

For some of the embodiments described herein, an overall fuel utilization that is higher than 65% may be achieved, by recirculating flow from the anode exhaust back to the anode inlet. Furthermore, by including the reforming step in a recirculation loop, the reformer water requirements may be met using only the water contained in the anode exhaust flow, without having to introduce additional water to the overall system.

Moreover, the embodiments described herein, (i.e., those that use an external reformer), advantageously implement reforming downstream of the first fuel cell. Because the reforming step occurs at a point between the first fuel cell exhaust and the second fuel cell inlet, some of the reformed fuel may be fed directly to the second fuel cell. According to one aspect, the reformer may be able to use more of the excess heat of the first fuel cell to enrich the fuel than what would be possible in present state-of-the-art fuel cell systems, thus increasing overall system efficiency. Other advantages of the cascaded fuel cell configuration described here include one or more of high system efficiency at all scales ranging from kW to MW; low temperature at anode recirculation point, which relaxes the material requirements on the recycle blower and splitter; and removal of product water in the fuel stream which boosts the Nernst potential.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system, comprising:
a first solid-oxide fuel cell configured to generate a first anode tail gas stream and a first cathode tail gas stream;
(ii) at least one fuel reformer located downstream of the first solid-oxide fuel cell, the fuel reformer configured to receive the first anode tail gas stream, and to mix the first anode tail gas stream with a reformer fuel stream to form a reformed stream;
(iii) a splitting mechanism to split the reformed stream into a first portion and a second portion;
(iv) a fuel path configured to circulate the first portion to an anode inlet of the first solid-oxide fuel cell, such that the first solid-oxide fuel cell is configured to generate a first electric power, at least in part, by using the first portion as a fuel;
(v) a second solid-oxide fuel cell configured to receive the second portion, and to generate a second electric power, at least in part, by using the second portion as a fuel, the second solid-oxide fuel cell further configured to generate a second anode tail gas stream and a second cathode tail gas stream;
(vi) a first recuperator configured to receive and extract heat from at least a portion of the first cathode tail gas stream and the second cathode tail gas stream to form a cooled cathode tail gas stream, and to transfer at least a portion of the extracted heat to the first portion of the reformed stream;
(vii) a recycle loop extending from an outlet of the first recuperator to a cathode inlet of the first solid-oxide fuel cell, wherein the recycle loop is configured to circulate at least a portion of the cooled cathode tail gas stream to the cathode inlet of the first solid-oxide fuel cell; and (viii) an air pre-heater configured to extract heat from at least another portion of the cooled cathode tail gas stream directed via a channel coupled to the recycle loop, and to transfer at least a portion of the extracted heat to a cathode inlet stream of the first solid-oxide fuel cell, wherein the recycle loop extends from the first recuperator to the first solid-oxide fuel cell bypassing the air pre-heater.

2. The power generation system of claim 1, wherein a ratio of the first portion of the reformed stream to a second portion of the reformed stream is in a range from about 0.6 to about 0.95.

3. The power generation system of claim 1, further comprising a second recuperator located downstream of the reformer and upstream of the splitting, mechanism, the second recuperator configured to extract heat from the reformed stream to form a cooled reformed stream, and to transfer at least a portion of the extracted heat to the first portion of the reformed stream.

4. The power generation system of claim 3, further comprising a first water separation twit located downstream of the second recuperator and upstream of the splitting mechanism, the water separation unit configured to separate at least a portion of water from the cooled reformed stream.

5. The power generation system of claim 4, further comprising a first fuel pre-heater located downstream of the reformer and upstream of the second recuperator, the first fuel pre-heater configured to extract heat from the reformed stream, and to transfer at least a portion of the extracted heat to the fuel stream entering the reformer.

6. The power generation system of claim 5, further comprising a second fuel pre-heater located downstream of the splitting mechanism and upstream of the second solid-oxide fuel cell, the second fuel pre-heater configured to extract heat from the second anode tail gas stream to form a cooled second anode tail gas stream, and to transfer at least a portion of the extracted heat to the second portion of the reformed stream.

7. The power generation system of claim 6, further comprising:
 a second water separation unit configured to separate at least a portion of water from the cooled second anode tail gas stream;
 a combusting unit configured to receive at least a portion of the cooled second anode tail gas stream and at least a portion of the cooled cathode tail gas stream; and
 an external combustion engine configured to receive an exhaust from the combusting unit to generate a third electric power.

8. A power generation system, comprising:
(i) a first solid-oxide fuel cell configured to generate a first anode tail gas stream and a first cathode tail gas stream;
(ii) a splitting mechanism to split the first anode tail gas stream into a first portion and a second portion;
(iii) a fuel path configured to circulate the first portion to an anode inlet of the first solid-oxide fuel cell, such that the first solid-oxide fuel cell is configured to generate a first electric power, at least in part, by using the first portion as a fuel;
(iv) a second solid-oxide fuel cell configured to receive the second portion, and to generate a second electric power, at least in part, by using the second portion as a fuel, the second solid-oxide fuel cell further configured to generate a second anode tail gas stream and a second cathode tail gas stream;
(vi) a first recuperator configured to receive and extract heat from at least a portion of the first cathode tail gas stream and the second cathode tail gas stream to form a cooled cathode tail gas stream, and to transfer at least a portion of the extracted heat to the first portion of the reformed stream;
(vii) a recycle loop extending from an outlet of the first recuperator to a cathode inlet of the first solid-oxide fuel cell, wherein the recycle loop is configured to circulate at least a portion of the cooled cathode tail gas stream to the cathode inlet of the first solid-oxide fuel cell; and
(viii) an air pre-heater configured to extract heat from at least another portion of the cooled cathode tail gas stream via a channel coupled to the recycle loop, and to transfer at least a portion of the extracted heat to a cathode inlet stream of the first solid-oxide fuel cell, wherein the recycle loop extends from the first recuperator to the first solid-oxide fuel cell bypassing the air pre-heater.

* * * * *